UNITED STATES PATENT OFFICE.

BEST AVAILABLE COPY

HERMANN REUSCH, OF DILLINGEN-ON-THE-SAAR, PRUSSIA, GERMANY, ASSIGNOR TO CARL REUSCH, OF NEW YORK, N. Y.

MODE OF PLATING IRON AND STEEL.

SPECIFICATION forming part of Reissued Letters Patent No. 10,367, dated August 14, 1883.

Original No. 258,119, dated May 16, 1882. Application for reissue filed March 27, 1883. Patented in France September 29, 1881, No. 145,070; in England October 12, 1881, No. 4,444; in Luxemburg October 12, 1881, No. 164, and in Belgium October 12, 1881, No. 55,946.

*To all whom it may concern:*

Be it known that I, HERMANN REUSCH, a subject of the King of Prussia, residing at Dillingen-on-the-Saar, Rhenish Prussia, German Empire, have invented certain new and useful improvements in the mode of plating iron and steel with such metals and metal alloys which can be rolled in red heat, and in the mode of plating such metals or metal alloys with each other; and I do hereby declare the following to be a full, clear, and exact description of the invention, such as will enable others skilled in the art to which it appertains to make and use the same.

The plating of iron and steel, without using a flux, with that class of metals or alloys of metals that can be rolled or drawn when heated to a red heat, or in the plating of such metals or alloys with one another, as heretofore effected, produces imperfect results, and for the following reasons: It is very difficult to prevent oxidation of the iron or steel during the process of heating, which oxidation is the cause of imperfect union of the two metals in numerous places, and, in fact, in some places no union or adhesion of the two metals can take place. When the so-plated metal is subsequently worked up, a great portion of it has to be thrown aside as useless.

The invention has for its object to avoid the oxidation of the metal to be plated, and to effect a perfect combination or union of the two metals or the metal and the alloy; and to this end the invention consists, first, in a process of plating iron or steel with such metals or alloys of metals as can be drawn or rolled at a red heat, which consists in covering the surface or surfaces to be plated with tin or an alloy thereof, then applying the metal with which the said surface or surfaces are to be plated, then heating the same to a red heat, and finally passing the heated metals between cold rolls; and, second, in first applying to the surface or surfaces to be plated a metallic chloride vaporizable at a red heat, then covering the surface or surfaces so treated with tin or an alloy thereof, and applying the metal with which said surface or surfaces are to be plated, and heating the same to a red heat, and finally passing the heated metals between cold rolls.

In carrying out my invention I take the iron or steel and first clean it thoroughly in the usual manner. I then apply to the surface or surfaces to be plated finely-pulverized chloride of zinc, or I paint the surface or surfaces with chloride of zinc dissolved in water, or I apply thereto muriate of ammonia or other metallic chloride vaporizable at a red heat. I next cover the surface or surfaces to be plated with a thin coat of tin or an alloy thereof. To facilitate the coating of the metal with tin, I preferably use tin-foil, which is readily applied, and upon this coat of tin-foil I apply the metal with which the iron or steel is to be plated. The iron or steel, prepared as set forth, is next heated to a red heat and passed between well-cooled smooth rolls and drawn to the required dimension. It will be readily understood that the thin coat or layer of tin between the two metals has the effect of preventing oxidation during the process of heating to a red heat, and furthermore serves as a flux by means of which said metals are intimately combined.

In plating metals or alloys of metals that can be drawn or rolled at a red heat—such as copper and silver—with one another, I proceed exactly as above set forth, and with the same excellent results.

The use of chloride of zinc, muriate of ammonia, or other metallic chloride that is vaporizable at a red heat is not indispensable, as I have obtained results equally as good without it. Yet I have found that the use of these metallic chlorides will greatly facilitate the plating.

The plating metal is applied to the tinned iron or steel in the form of sheets or plates after the well-known mode of plating by fastening or otherwise holding the two metals together. No claim is made to any specific method of applying the plating metal.

Having thus described my invention, what I claim is—

1. The process of plating iron or steel with such metals or alloys of metals as can be drawn or rolled at a red heat, which consists in covering the surface or surfaces to be plated with tin or an alloy thereof, then applying the metal with which the said surface or surfaces are to be plated, then heating the same to a red heat, and finally passing the heated metals between cold rolls, substantially as described.

2. The process of plating iron or steel with such metals or alloys of metals as can be drawn or rolled at a red heat, which consists in first applying to the surface or surfaces to be plated a metallic chloride vaporizable at a red heat, then covering the surface or surfaces so treated with tin or an alloy thereof, and applying the metal with which said surface or surfaces are to be plated, and heating the same to a red heat, and finally passing the heated metals between cold rolls, substantially as and for the purpose specified.

In testimony whereof I have hereunto signed my name before two subscribing witnesses.

HERMANN REUSCH.

Witnesses:

GEORGE LOUBIER,

B. ROI.